(12) United States Patent
Hernandez Millan

(10) Patent No.: US 12,706,480 B2
(45) Date of Patent: Aug. 11, 2026

(54) HYBRID ENERGY STORAGE AND MANAGEMENT SYSTEM

(71) Applicant: Rafael Hernandez Millan, Boca Raton, FL (US)

(72) Inventor: Rafael Hernandez Millan, Boca Raton, FL (US)

( * ) Notice: Subject to any disclaimer, the term of this patent is extended or adjusted under 35 U.S.C. 154(b) by 352 days.

(21) Appl. No.: 18/536,297

(22) Filed: Dec. 12, 2023

(65) Prior Publication Data

US 2024/0195218 A1 Jun. 13, 2024

Related U.S. Application Data

(60) Provisional application No. 63/431,850, filed on Dec. 12, 2022.

(51) Int. Cl.
*H02J 15/50* (2026.01)
*H02J 7/34* (2006.01)
*H02J 101/30* (2026.01)

(52) U.S. Cl.
CPC .............. *H02J 15/50* (2026.01); *H02J 7/345* (2013.01); *H02J 2101/30* (2026.01); *H02J 2207/50* (2020.01)

(58) Field of Classification Search
CPC ........ H02J 15/50; H02J 7/345; H02J 2101/30; H02J 2207/50
USPC .......................................................... 700/286
See application file for complete search history.

(56) References Cited

U.S. PATENT DOCUMENTS 3,479,165 A 11/1969 Lyon
8,864,974 B2 10/2014 Geurts
10,840,572 B1 * 11/2020 Luz .......................... H02J 3/28
11,447,878 B2 9/2022 Bartkowiak
2008/0138675 A1 6/2008 Jang
2011/0006544 A1 1/2011 Geurts
2024/0305235 A1 * 9/2024 Singh ..................... H02S 10/20

* cited by examiner

*Primary Examiner* — Michael J Brown
(74) *Attorney, Agent, or Firm* — Brennan, Manna & Diamond, LLC

(57) ABSTRACT

A hybrid energy storage and management system is disclosed. The system includes fuel cells, working in conjunction with one or more electrolyzers to split water into hydrogen gas and oxygen gas. The gases are then stored for later use in generating electricity by fuel cells. The system uses heat management, ensuring the efficient utilization of heat produced by fuel cells and electrolyzers. The system incorporates batteries for electricity storage and super-capacitors to offer rapid response to electrical demands. In some embodiments, the system includes AC/DC, DC/DC, DC/AC converters to meet requirements of different large scale and small scale applications.

12 Claims, 8 Drawing Sheets

HYBRID ENERGY STORAGE AND MANAGEMENT SYSTEM

CROSS-REFERENCE TO RELATED APPLICATION

The present application claims priority to, and the benefit of, U.S. Provisional Application No. 63/431,850, which was filed on Dec. 12, 2022 and is incorporated herein by reference in its entirety.

FIELD OF THE INVENTION

The present invention generally relates to the field of energy systems. More specifically, the present invention relates to a novel energy system designed to store and release electricity in small-scale and large-scale applications. The system offers long duration hydrogen energy storage that can function as a backup power source. The system utilizes an electrolyzer to produce hydrogen when there is excess electricity running through the system, enabling a fuel cell to convert the energy stored in the hydrogen carrier. The system improves power generation and offers backup power during extended power outages. Accordingly, the present disclosure makes specific reference thereto. Nonetheless, it is to be appreciated that aspects of the present invention are also equally applicable to other such as applications, devices, and methods of manufacture.

BACKGROUND

By way of background, electricity provides safe and reliable lighting, enabling individuals to extend their productive hours, engage in evening activities, and enhance their security. Electricity is essential for operating water pumps and sanitation systems, ensuring access to clean drinking water and proper waste disposal. Electricity also enables the establishment and operation of small businesses, creating employment opportunities, and diversifying rural economies. However, rural and isolated areas are often located far from urban centers and major infrastructure and can lack essential services such as electricity and potable water. Lack of essential services is due to various factors such as the remote location, which makes it more difficult and expensive to extend infrastructure such as power lines and water pipes. For example, in rural areas, power outages can be more common and last longer than in urban areas. Extended power outages can significantly disrupt daily life. Individuals may not be able to use essential household appliances or charge communication devices.

Unavailability of electrical power impacts all electrical appliances including food storage appliances such as refrigerators and freezers. Without power, the temperature inside such appliances rises, leading to the spoilage of perishable items. In some cases, the cost of utilities such as electricity can be higher in rural areas due to the increased costs of providing services to these less accessible locations. To manage expenses, residents try to minimize their use of electricity which can involve reducing the use of heating/cooling systems, appliances, and lights, thereby affecting their quality of life.

Current solutions include effective transfer of electricity from power generators/power plants but cost and effectiveness of transferring electricity are challenges. Also, use of conventional solar cells and wind power generation systems is ineffective as they do not work in low light, during rainy days, during windless days, and/or at nights. Further, conventional solutions do not provide long-term energy storage for extended power outages.

Also, as the world transitions to a decarbonized energy system, emerging long-term energy storage technologies that support the deployment of intermittent renewable energy sources are desired. Individuals desire an improved system that provides long-term energy storage and releases of electricity for small-scale and large-scale applications, thereby improving power generation and offering backup power during extended power outages.

Therefore, there exists a long felt need in the art for an improved energy storage and release system for rural and isolated areas. Additionally, there is a long felt need in the art for an electrical energy storage and release system that can be used with different renewable sources such as solar panels and wind power converters (i.e., secondary power unit/source), as well as with traditional power grids. Moreover, there is a long felt need in the art for an energy storage system that is adaptable to different energy infrastructures and that is beneficial in areas with varying renewable energy availability. Further, there is a long felt need in the art for an energy system that stores and selectively releases electrical power for different applications such as housing, transportation, and more. Furthermore, there is a long felt need in the art for an energy storage system that provides long-term energy storage and manages fluctuations in demand and supply of electrical power. Finally, there is a long felt need in the art for a long-term electrical energy storage system that improves power generation and offers backup power during extended power outages.

The subject matter disclosed and claimed herein, in one embodiment thereof, comprises an energy storage system designed to efficiently store and manage electrical energy for both small-scale and large-scale applications. The system includes one or more electrolyzers for splitting water (H2O) or aqua through electrolysis into hydrogen (H2) and oxygen (O2). A controller to control the operation of one or more electrolyzers. A hydrogen storage for the storage of hydrogen generated by the electrolyzers. An oxygen storage adapted to store oxygen generated from the electrolyzers. An additional hydrogen tank and an additional oxygen tank to function as buffers for temporarily storing excessive hydrogen and oxygen produced in the electrolyzers. One or more fuel cells to convert the chemical energy of hydrogen (H2) and oxygen (O2) into electrical energy. A water tank functioning as a water collector, designed to collect water generated by one or more fuel cells. One or more batteries for storing electricity produced by the system. One or more super-capacitors to facilitate rapid response times for the exchange of electrical power. The system can be designed to provide power to district heating systems, cooling systems, vehicles, charging stations, and more.

In this manner, the hybrid energy storage system of the present invention accomplishes all of the forgoing objectives and provides users with a hybrid energy storage and management system that efficiently stores electrical energy, making it suitable for both small-scale and large-scale applications. The system can be adapted to various energy sources, including renewable sources such as solar panels and wind turbines (i.e., secondary power unit/source), or conventional power grids. The system is environmentally friendly, producing only heat as a byproduct. The system utilizes clean technologies such as hydrogen and oxygen generation through electrolysis and fuel cell technology, contributing to a reduction in greenhouse gas emissions. The system combines multiple energy storage technologies, including hydrogen storage, batteries, and super-capacitors. The combination provides a wide range of energy storage options, enabling the system to adapt to different energy requirements and usage patterns.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an electrical energy storage system. The system further comprising a unitized fuel cell and an electrolyzer to split the water into hydrogen and oxygen. One or more hydrogen storage tanks for storing hydrogen and one or more oxygen storage tanks for storing oxygen. Hybrid batteries store electrical power and super-capacitors provide rapid electricity transfer.

In yet another embodiment, a hydrogen system based on a regenerative fuel cell architecture is disclosed. The architecture further comprising a regenerative fuel cell capable of both generating electricity and functioning in reverse to produce hydrogen and oxygen from water. An electrolyzer utilizing electrical energy to split water (H2O) into the constituent elements-hydrogen (H2) and oxygen (O2). A plurality of batteries to enhance system flexibility and to increase electrical capacity for demand cycles. A plurality of super-capacitors for rapid response to changing electrical demands.

In a further embodiment of the present invention, a hybrid energy storage and management system designed to efficiently store and manage electrical energy for both small-scale and large-scale applications is disclosed. The system includes one or more electrolyzers for splitting water (H2O) or aqua through electrolysis into hydrogen (H2) and oxygen (O2). A controller to control the operation of one or more electrolyzers. A hydrogen storage for the storage of hydrogen generated by the electrolyzers. An oxygen storage adapted to store oxygen generated from the electrolyzers. An additional hydrogen tank and an additional oxygen tank to function as buffers for temporarily storing excessive hydrogen and oxygen produced in the electrolyzers. One or more fuel cells to convert the chemical energy of hydrogen (H2) and oxygen (O2) into electrical energy. A water tank functioning as a water collector, designed to collect water generated by one or more fuel cells. One or more batteries for storing electricity produced by the system. One or more super-capacitors to facilitate rapid response times for the exchange of electrical power. A heat management system for managing the heat generated or recovered by the fuel cells and electrolyzers.

In another aspect, the system includes a control, a communication, and a supervision subsystem for collecting connectivity and leakage data throughout the hybrid battery system.

In yet another embodiment, the system includes a plurality of switches to regulate the flow of electrical energy between different components of the system.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
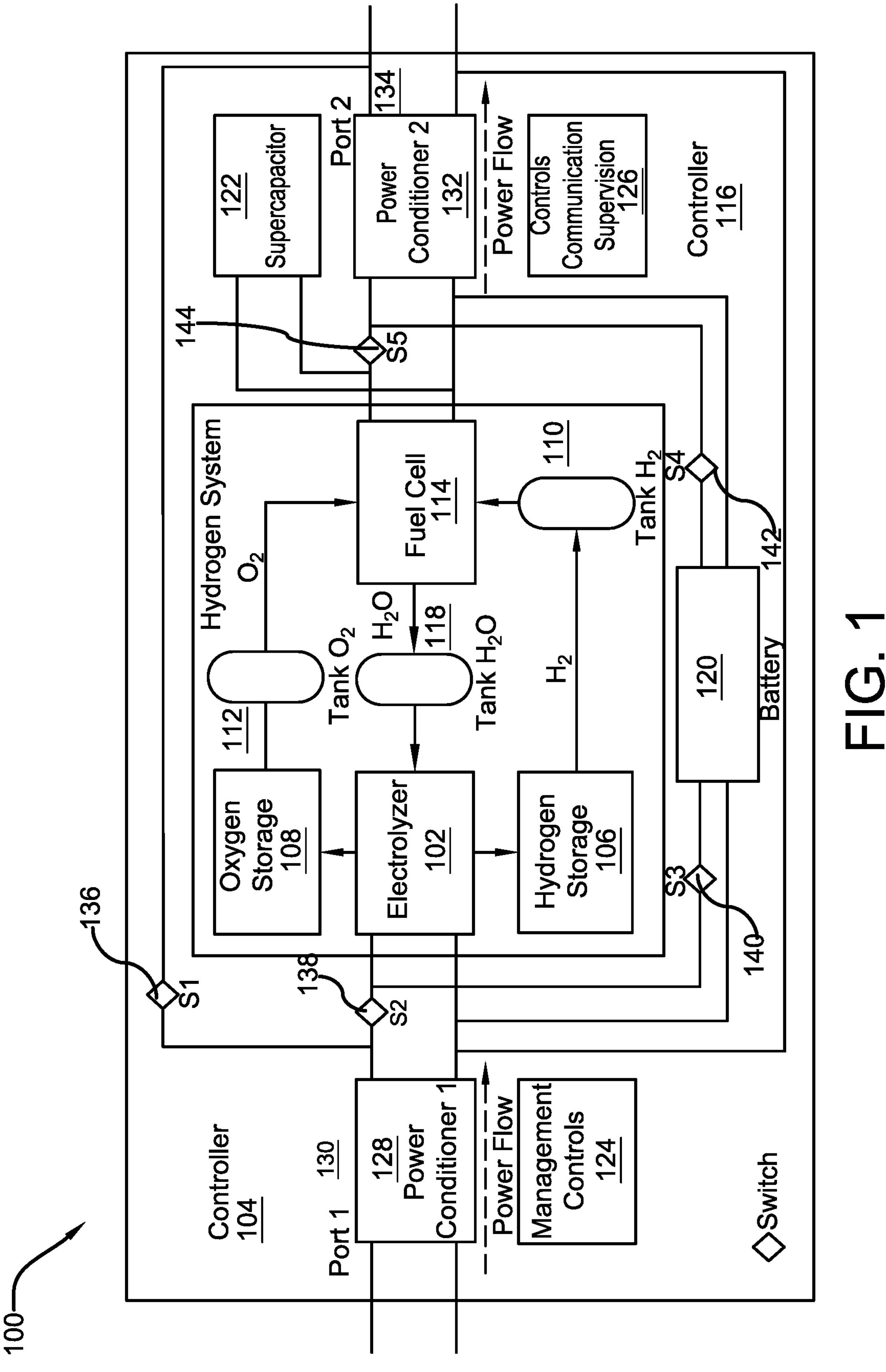
FIG. 1 illustrates a functional block diagram of the hybrid energy storage and management system of the present invention in accordance with the disclosed architecture.

The innovation is now described with reference to the drawings, wherein such as reference numerals are used to refer to such as elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved energy storage and release system for rural and isolated areas. Additionally, there is a long felt need in the art for an electrical energy storage and release system that can be used with different renewable sources such as solar panels and wind power converters (i.e., secondary power unit/source), as well as with traditional power grids. Moreover, there is a long felt need in the art for an energy storage system that is adaptable to different energy infrastructures and that is beneficial in areas with varying renewable energy availability. Further, there is a long felt need in the art for an energy system that stores and selectively releases electrical power for different applications such as housing, transportation, and more. Furthermore, there is a long felt need in the art for an energy storage system that provides long-term energy storage and manages fluctuations in demand and supply of electrical power. Finally, there is a long felt need in the art for a long-term electrical energy storage system that improves power generation and offers backup power during extended power outages.

The present invention, in one exemplary embodiment, is a hydrogen system based on a regenerative fuel cell architecture. The architecture further comprising a unitized fuel cell/electrolyzer capable of both generating electricity and functioning in reverse to produce hydrogen and oxygen from water. An electrolyzer utilizing electrical energy to split water (H2O) into the constituent elements—hydrogen (H2) and oxygen (O2). A plurality of batteries to enhance system flexibility and to increase electrical capacity for demand cycles. A plurality of super-capacitors for rapid response to electrical demands.

The present invention provides a hydrogen system, particularly through a unitized fuel cell/electrolyzer. A unitized fuel cell/electrolyzer is used that can both generate electricity and function in reverse to produce hydrogen and oxygen from water. An electrolyzer uses electrical energy to split water (H2O) into its constituent elements—hydrogen (H2) and oxygen (O2). After the electrolysis process, hydrogen and oxygen are stored separately. The stored gases are then used to generate electricity. When electrical energy is needed, hydrogen and oxygen are fed into the fuel cell. In the fuel cell, the gases react chemically to generate electricity, with water being a byproduct of this reaction. The water produced in the fuel cell is not wasted but stored and can be used again in the electrolyzer to be split into hydrogen and oxygen, making the process cyclical and sustainable. The system is environmentally friendly and the only by-product, apart from electricity, is heat.

The heat produced by both the fuel cell and the electrolyzer is managed. Effective heat management is crucial for the efficiency and longevity of the system. To enhance the system, batteries and super-capacitors are incorporated. Batteries provide additional flexibility and increased capacity for electrical demand cycles. Super-capacitors are included to respond rapidly to electrical demands.

Referring initially to the drawings, FIG. 1 illustrates a functional block diagram of the hybrid energy storage and management system of the present invention in accordance with the disclosed architecture. The hybrid energy storage and management system 100 is designed to efficiently store and manage electrical energy for small-scale and large-scale applications. More specifically, the hydrogen energy storage system 100 includes one or more electrolyzers 102 for splitting water or aqua through electrolysis into hydrogen gas and oxygen gas. When more than one electrolyzer is installed, a controller 104 can be used for controlling operation of one or more electrolyzers.

A hydrogen storage 106 stores hydrogen gas generated by the electrolyzers 102 and the hydrogen storage 106 can be one or a combination of underground systems, pressurized vessels, liquid hydrogen, solid hydrogen in hydride vessels, and/or reversible chemical absorbers/adsorbers. An oxygen storage 108 is adapted to store oxygen gas generated from the electrolyzers 102 and can be one or a combination of underground systems, pressurized vessels, liquid oxygen, and/or reversible chemical absorbers/adsorbers.

When excessive hydrogen and oxygen gases are produced in the electrolyzers 102, then additional hydrogen gas is stored in a hydrogen tank 110 and additional oxygen gas is stored in an oxygen tank 112. The tanks 110, 112 function as buffers for temporarily storing the excessive hydrogen and oxygen gases.

One or more fuel cells 114 are used in the system 100 and are configured to convert the chemical energy of hydrogen and of oxygen, into electrical energy. When multiple fuel cells 114 are used, then, a fuel cell controller 116 is used for controlling operation of one or more fuel cells 114. A water tank 118 integrates water collection from one or more fuel cells 114 and functions as a water collector. Further, the collected water is passed to the electrolyzer 102 for electrolysis of water.

For storing electricity produced by the system 100, one or more batteries 120 are included in the system 100. The batteries 120 can be any conventional batteries depending on the electricity produced by the system 100. Preferably, the batteries 120 are Lithium-Ion or any alkaline batteries. One or more super-capacitors 122 are included for fast response times for rapid exchange of electric power. Super-capacitors 122 complement the slower energy exchanges of batteries 120.

A heat management system 124 is included and is responsible for managing the heat generated or recovered by the fuel cells 114 and electrolyzers 102. The heat management system 124 automatically uses the heat for hydrogen storage 106 and oxygen storage 108 and a portion can also be used for export to external applications such as district heating/cooling or electricity generation. The heat system 124 centrally controls the heat and temperature of the system 100.

A control, communication, and supervision subsystem 126 is included for collecting connectivity and leakage data using a plurality of sensors (not shown) located throughout the hybrid battery system 120. The subsystem 126 communicates the received data to different controlling systems such as controlling computers to control and oversee the entire system 100.

The system 100 includes a first power conditioner 128 at the input port 130 and a second power conditioner 132 at the output port 134 of the system 100. The power conditioners 128, 132 are adapted to convert DC to DC (adjusting DC voltage), DC to AC conversion, and vice versa for adapting the system 100 to different small-scale and large-scale industries.

A plurality of switches are included in the system 100 for controlling the flow of electrical energy between different components of the system 100. As illustrated, Switch "S1" 136 connects the first power conditioner 128 to the energy delivery port 134. The switch "S2" 138 connects the hydrogen system to the input port 130 through the first power conditioner 128. The switch "S3" 140 connects the battery system 120 to the input port 130. The switch "S4" 142 connects the battery system 120 to the energy delivery port/output port 134. The switch "S5" 144 connects the hydrogen system to the energy delivery port 134 through the second power conditioner 132.

The system 100 can be used with renewable sources such as solar panels or wind turbines, or from a conventional power grid. For example, on a sunny day, when there is excess electrical energy from the solar panels (i.e., secondary power unit/source), the electrolyzer 102 activates to produce hydrogen. Hydrogen and oxygen are stored as described earlier in the disclosure in the hydrogen storage 106 and the oxygen storage 108, respectively. The fuel cell 114 can later convert the stored hydrogen back into electricity when needed to provide a continuous supply of electrical power. The system 100 can also deliver hydrogen to vehicles or hydrogen distribution facilities for additional benefits. For meeting requirements of different users, the system 100 can be designed to be used with AC electricity or alternatively to be used primarily with DC electricity.

Figure 2:
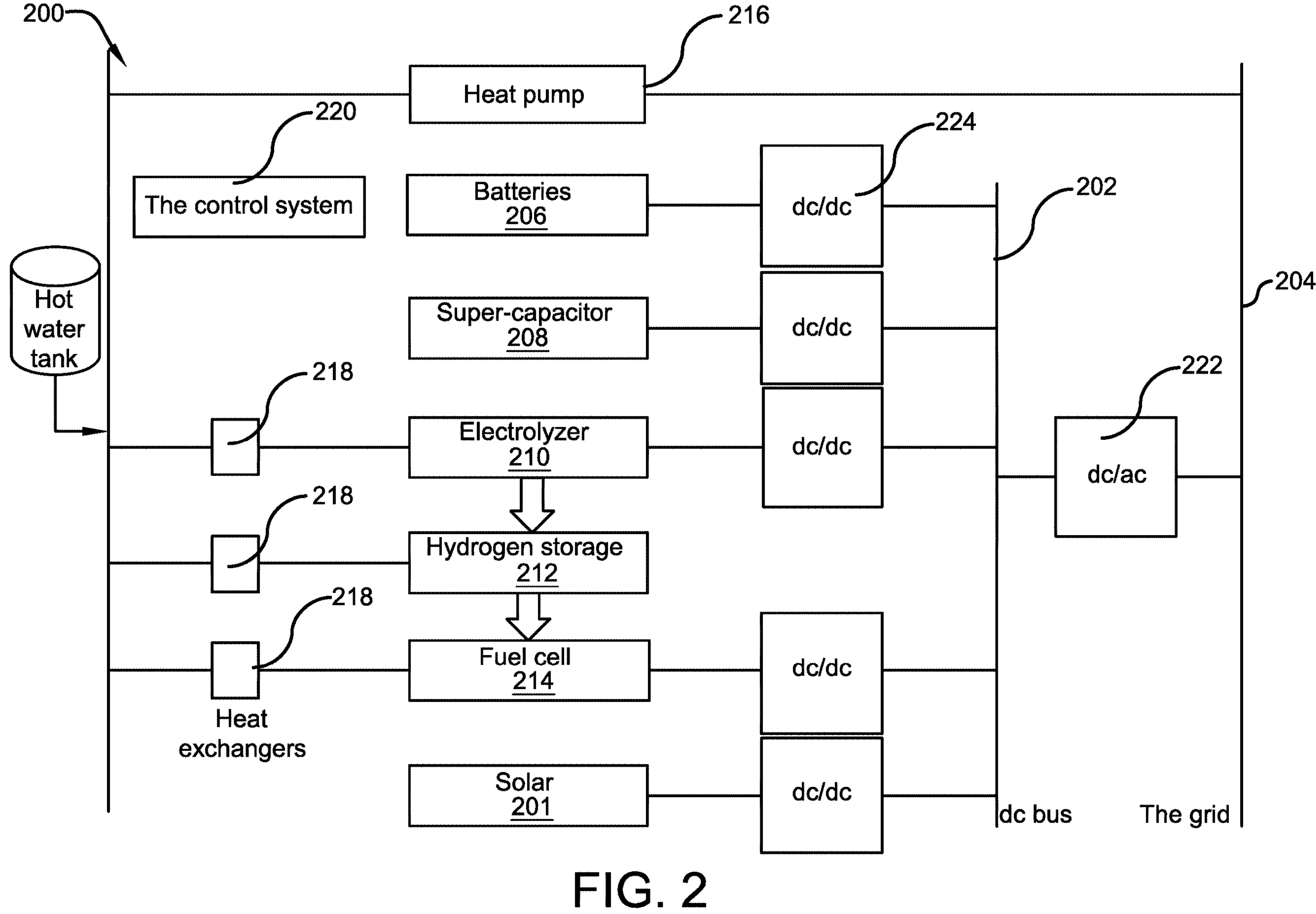
FIG. 2 illustrates another embodiment of the hybrid battery system of the present invention designed for a residential setting for long-term energy storage in accordance with the disclosed architecture.
Figure 3:
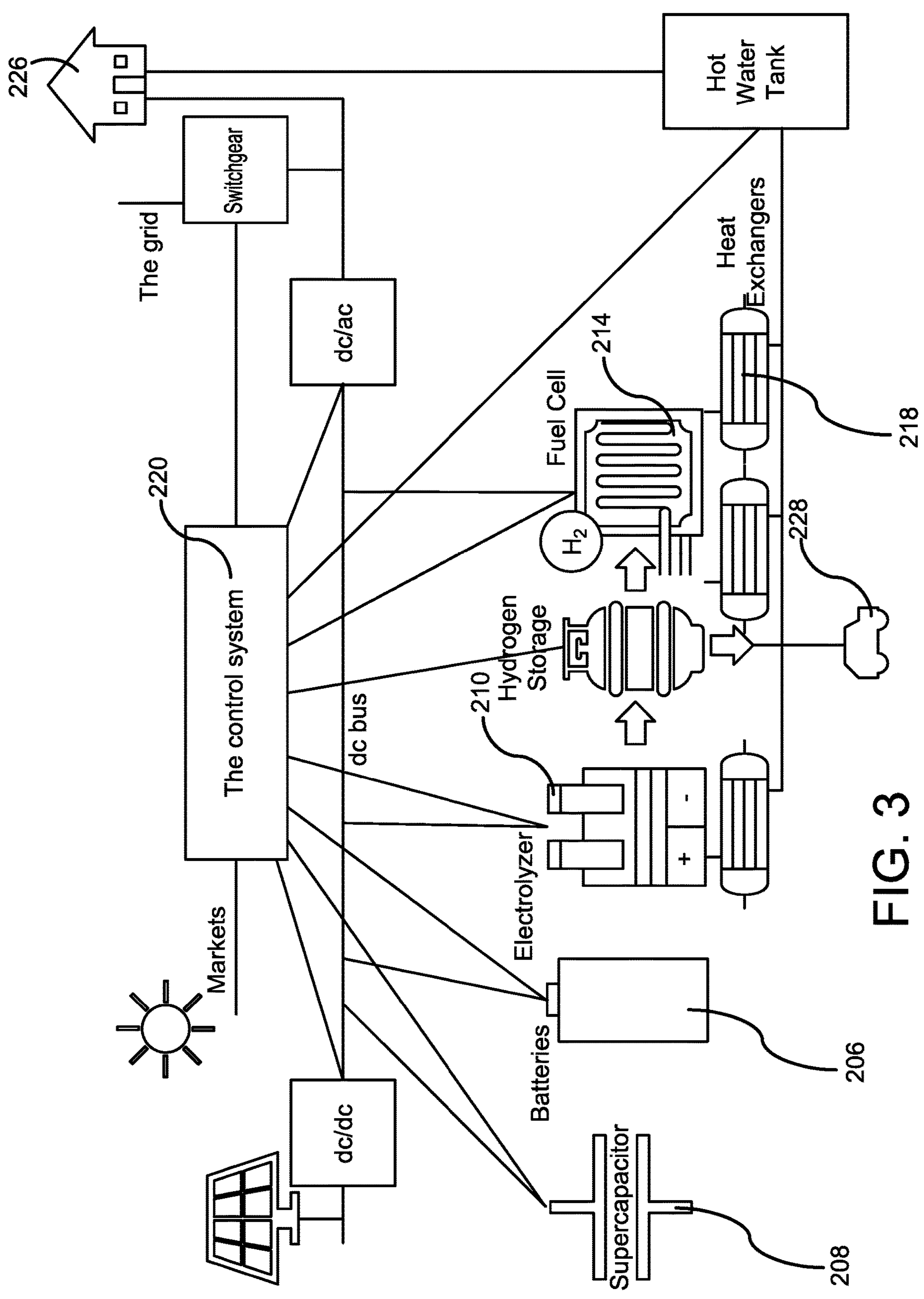
FIG. 3 illustrates use of the system of FIG. 2 for providing power to different applications.

FIG. 2 illustrates another embodiment of the hybrid battery system of the present invention designed for a residential setting for long-term energy storage in accordance with the disclosed architecture. Referring now to FIGS. 2 and 3, the system 200 is designed to integrate with a direct current (DC) architecture using a DC bus 202, optimized for solar energy utilization. In the system 200, the primary energy source is a solar-powered source 201 and the system 200 is connected to an electrical grid 204. One or more batteries 206 store electrical energy for longer-term use and super-capacitors 208 provide rapid energy discharge and charge, offering a quick response to immediate power demands.

The system 200 such as the hydrogen energy system 100 of FIG. 1 includes an electrolyzer 210, hydrogen storage 212, and a fuel cell 214. The electrolyzer 210 uses excess solar energy to produce hydrogen, effectively storing the surplus energy. Accordingly, in case of a power outage or when solar energy is insufficient, the stored hydrogen can be converted back to electricity by the fuel cell 214, providing long-term backup power.

The system 200 includes a heat pump 216 to supply heat during winter and to enhance the Coefficient of Performance (COP) of the system 100 by exchanging thermal energy with the environment. The heat generated by the electrolyzer 210 and the fuel cell 214 is used by heat exchangers 218 for heating water to fulfil the heating needs of the residence, particularly during colder months. A control system 220 manages and controls the operation of the system 200. The system also uses DC/AC converters 222 and a plurality of DC/DC converters 224.

Referring now to FIG. 3, the system 200 is multi-functional and can also provide energy for transportation in addition to residence 226. For example, a fuel cell-driven family car 228 can be refueled with excess solar power and the hydrogen produced by the system 200.

Figure 4:
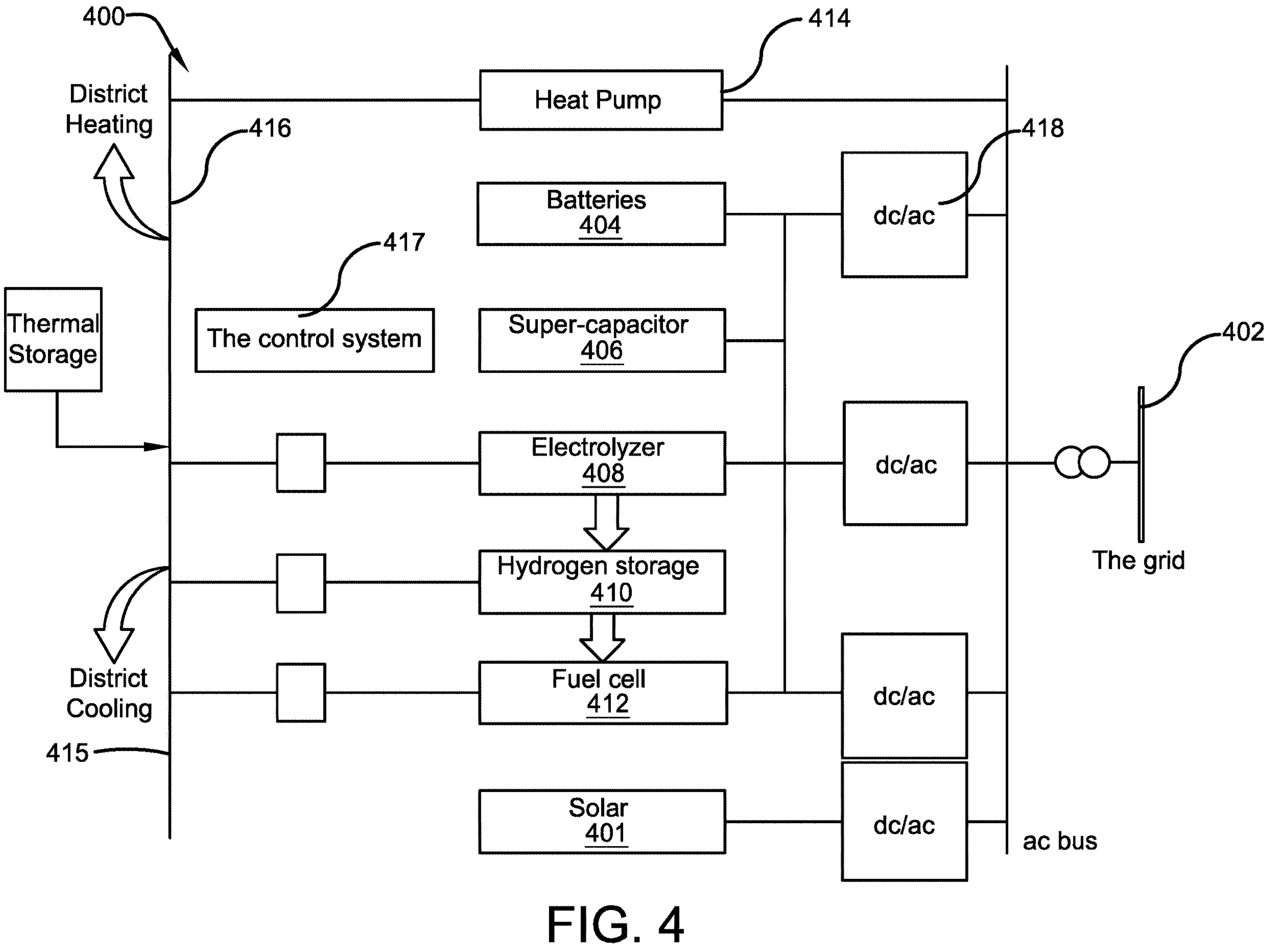
FIG. 4 illustrates a functional block diagram of another embodiment of the energy storage and release system of the present invention in accordance with the disclosed architecture.

FIG. 4 illustrates a functional block diagram of another embodiment of the energy storage and release system of the present invention in accordance with the disclosed architecture. The energy storage and release system 400 is solar charged 401 and connected to an electrical grid 402, enabling for both the supply of solar energy to the grid and the utilization of grid power when solar production is insufficient. The system 400 includes batteries 404 and super-capacitors 406. The batteries 404 store large amounts of energy over longer periods, and super-capacitors 406 provide quick bursts of energy.

An electrolyzer 408 uses excess solar energy (or other secondary power unit/source) to produce hydrogen. The hydrogen can be stored in a hydrogen storage 410 and then used in a fuel cell 412 to generate electricity, particularly useful for long-term backup during outages. A heat pump 414 is integrated into the energy storage and release system 400, primarily for heating purposes during the winter. Heat pump 414 exchanges energy with the environment, thereby improving the system COP (energy output per unit of energy input). The heat pump 414 can be connected to the building or district heating system 416 and cooling system 415. The system 400 can use the waste heat generated by the electrolyzer 408 and the fuel cell 412. The heat can be utilized for district heating, residential hot water heating, and other heating needs. A control system 417 is included in the system 100 for controlling the operations of different components of the system 100. Depending on the requirements of the users, a plurality of DC/AC converters 418 are included in the system 400.

Figure 5:
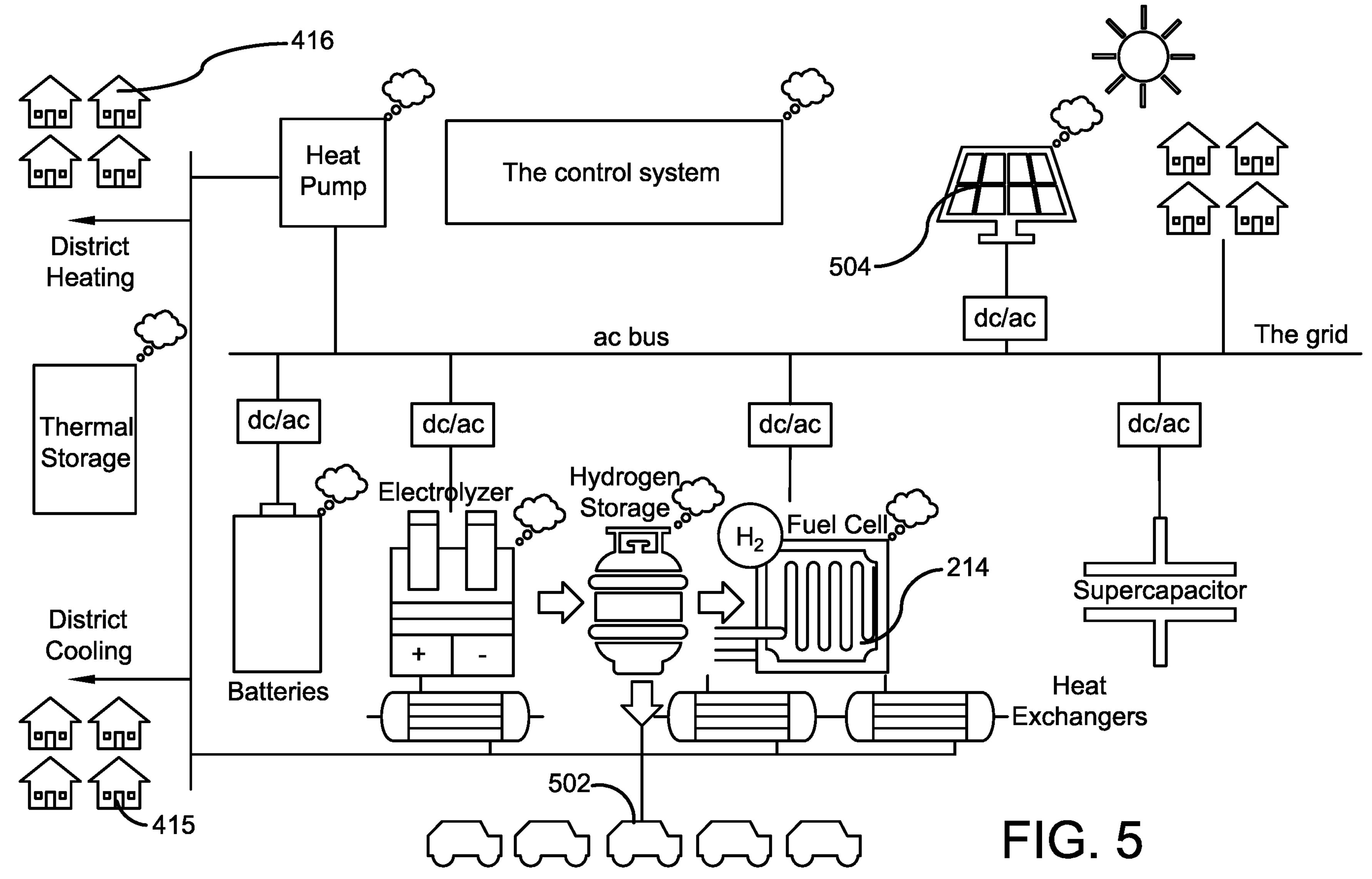
FIG. 5 illustrates use of the system of FIG. 4 for providing power to different applications.

Referring now to FIG. 5, the system 400 can be used for charging battery-driven vehicles 502, to be used as an integrated electric vehicle (EV) charging infrastructure. The system 400 can also be used for home 504 and other applications such as district cooling and heating.

Figure 6:
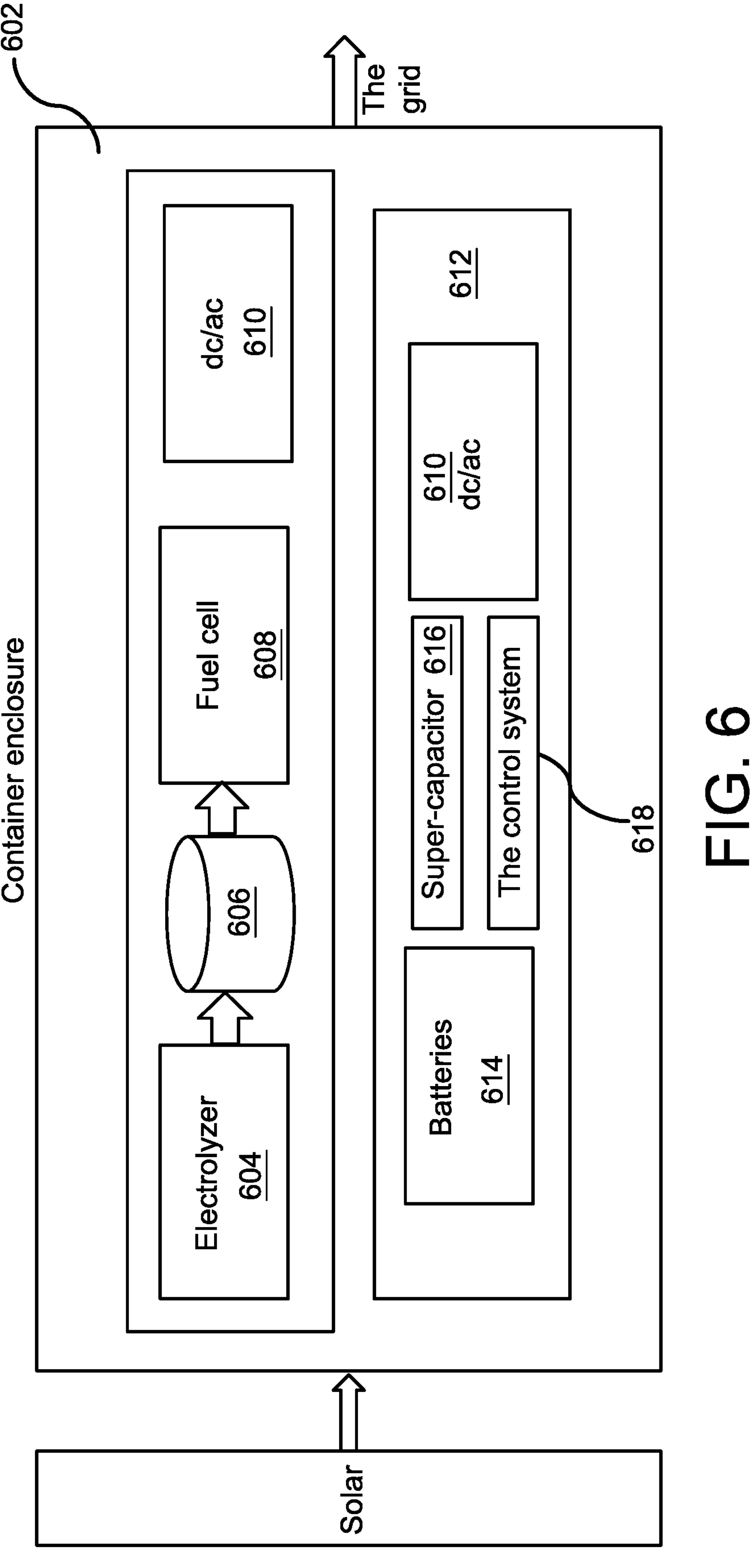
FIG. 6 illustrates a functional block diagram of a containerized hybrid battery embodiment of the energy storage system of the present invention in accordance with the disclosed structure.

FIG. 6 illustrates a functional block diagram of a containerized hybrid battery embodiment of the energy storage system of the present invention in accordance with the disclosed structure. The containerized battery system 600 includes a housing or an enclosure 602 that encloses all the components of the system 600. The enclosure 602 is designed to protect the internal parts and also to make the entire battery unit portable and easy to install.

An electrolyzer 604 uses electrical energy to split water into hydrogen and oxygen. The electrolyzer 604 produces hydrogen when there is an excess supply of electricity, such as during peak solar or wind generation times. The hydrogen storage 606 of the appliance 600 stores the hydrogen produced by the electrolyzer 604. The hydrogen is stored until required by the fuel cell 608 to generate electricity. A hydride vessel may be used for storing hydrogen. The hydride vessel enables safe and efficient storage of hydrogen in a solid form as metal hydrides.

The fuel cell 608 converts hydrogen back into electrical energy. The fuel cell 606 is useful when there is a demand for electricity but insufficient direct supply from renewable sources or from the grid. One or more current converters 610 convert the electrical current from one form to another (AC to DC or vice-versa) depending on the requirement of an appliance being powered.

A chemical energy storage system 612 includes traditional batteries 614 and super-capacitors 616. Batteries 614 can store energy chemically and are useful for extended storage, while super-capacitors 616 are for short-term storage and quick energy release. A controller 618 manages the operation of the hybrid battery 614, ensuring optimal performance and safety. The controller 618 also controls the way in which energy is stored, released, and converted within the containerized battery system 600.

The containerized battery system 600 may include power electronics (not shown) which manages the flow of electrical power and can include components such as inverters and converters that adjust voltage and current to match the needs of the battery and the devices powered by the containerized battery system 600.

The system 600 can be manufactured in various capacities and configurations to suit different needs. The system 600 may include different ratings for fuel cell power, electrolyzer capacity, energy storage, battery capacities, and super-capacitors. The electrical configurations can also vary to comply with local electrical codes (such as the number of phases, frequency, and voltages).

Figure 7:
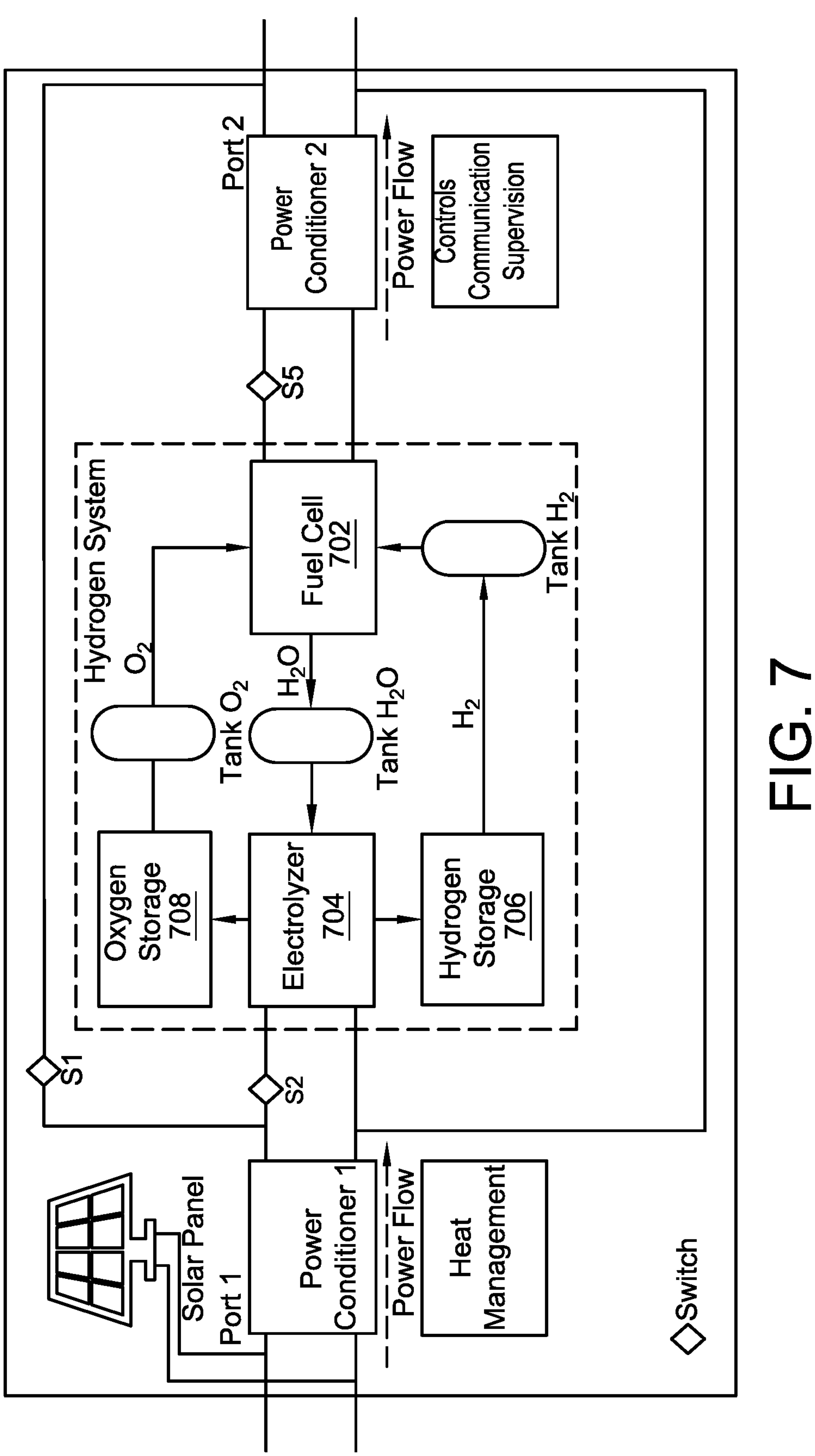
FIG. 7 illustrates a solar-powered (i.e., secondary power unit/source) regenerative fuel cell system in accordance with one embodiment of the present invention.

FIG. 7 illustrates a solar-powered regenerative fuel cell system in accordance with one embodiment of the present invention. The solar-powered regenerative fuel cell system 700 is used for long-term energy storage in isolated applications. The system 700 has high energy density per weight. The system 700 includes a fuel cell 702 that generates electricity through a chemical reaction between hydrogen and oxygen, without combustion. The by-products are water and heat.

Electrolyzer 704 uses solar power (or other secondary power unit/source) to split water into hydrogen and oxygen, which are then stored separately in storage tanks 706, 708. In use, when electricity is needed, the fuel cell 702 combines hydrogen and oxygen to produce electricity, water, and heat. When there is excess solar power (or when electricity is not needed), the electrolyzer 704 uses this power to split water into hydrogen and oxygen, refilling the storage tanks.

Similar to the system 100, the system 700 also includes additional components. The system 700 can be designed for power systems at planned bases on the Moon, Mars, and other space applications. The high energy density and ability to store energy for long durations make the system 700 ideal for the extreme conditions and limited resources of space environments. Further, the system 700 can be used for long-term autonomous high-altitude planes used in communications, surveillance, and military operations. Such planes require power sources that are lightweight and capable of long-term operation without refueling. The system 700 can also be used in remote or isolated locations on Earth where traditional power sources are impractical.

Figure 8:
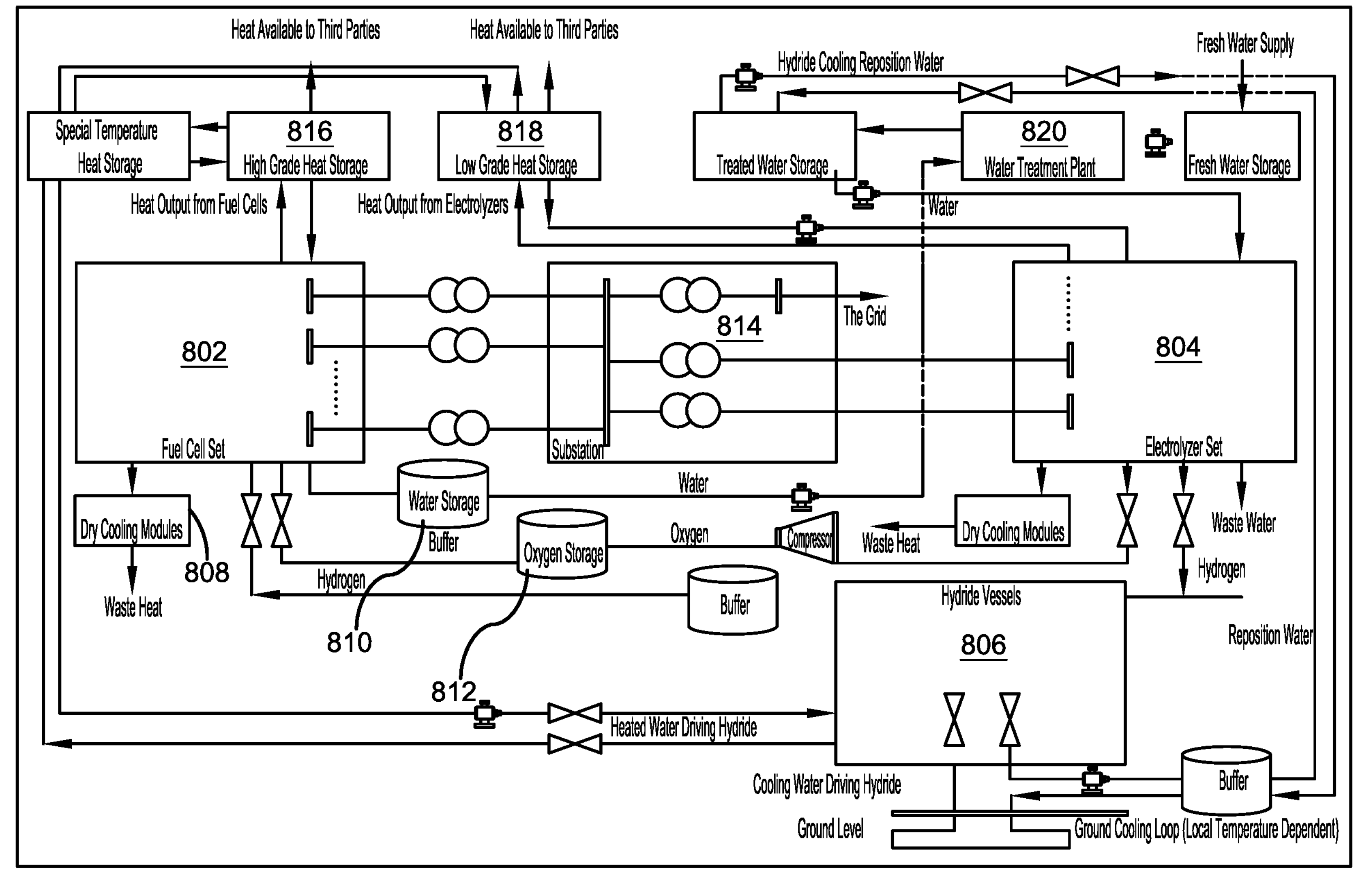
FIG. 8 illustrates a flow diagram of a utility-scale hybrid battery system that uses a regenerative fuel cell architecture.

FIG. 8 illustrates a flow diagram of a utility-scale hybrid battery system that uses a unitized fuel cell/electrolyzer architecture. The system is designed for a significant scale of energy storage, specified as 50 MW power capacity with 300 MWh of energy storage capacity. A fuel cell set 802 consists of multiple fuel cells to convert hydrogen into electricity, with water and heat as by-products. The fuel cells can be contained within a building and can be of a standard design provided by a leading manufacturer.

An electrolyzer set 804 splits water into hydrogen and oxygen through the process of electrolysis. The electrolyzers can be placed on the floor, such as for a ground-level installation. Hydride vessels 806 are used for hydrogen storage. Hydrides are compounds that can absorb and release hydrogen, which makes them useful for storing hydrogen in a compact form. Dry cooling modules 808 are used to remove heat from the process without the need for additional water, which is beneficial in areas where water is scarce.

Water and oxygen buffer tanks 810, 812 store the oxygen and water produced during the electrolysis process. A substation 814 connects the hybrid battery system to a power grid. A high-grade heat storage 816 and a low-grade heat storage 818 store the waste heat generated by the fuel cells 802 and electrolyzers 804. This heat can potentially be used for other applications. A water treatment plant 820 treats water that can be used in the electrolyzer set for generating hydrogen and oxygen. A control system can be used for managing the operation of the system 800.

During periods of low demand or high production (for example, when renewable sources such as wind or solar are producing more electricity than needed), the excess electricity would be used by the electrolyzer set to produce hydrogen. This hydrogen can then be stored in the hydride vessels. When the demand for electricity is high or production is low, the stored hydrogen can be fed into the fuel cell set to generate electricity, thus releasing the stored energy back into the grid.

The water produced by the fuel cells can be recycled back into the system, indicating a closed-loop design that minimizes waste. The control system is designed to manage the flow of materials and energy throughout the entire system to ensure efficient operation.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "hybrid energy storage and management system", "hydrogen energy storage system", "energy storage and release system", "containerized battery system", and "system" are interchangeable and refer to the hybrid energy storage and management system 100 of the present invention.

Notwithstanding the forgoing, the hybrid energy storage and management system 100 of the present invention can be of any suitable size and configuration as is known in the art without affecting the overall concept of the invention, provided that it accomplishes the above stated objectives. One of ordinary skill in the art will appreciate that the hybrid energy storage and management system 100 as shown in the FIGS. is for illustrative purposes only, and that many other sizes and shapes of the hybrid energy storage and management system 100 are well within the scope of the present disclosure. Although the dimensions of the hybrid energy storage and management system 100 are important design parameters for user convenience the hybrid energy storage and management system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hydrogen energy storage system comprising:

at least one electrolyzer;

a hydrogen tank;

an oxygen tank;

a plurality of fuel cells;

a fuel cell controller controls operation of said plurality of fuel cells;

a plurality of batteries, wherein said plurality of batteries store electricity produced by said hydrogen energy storage system, wherein said plurality of batteries are selected from the group consisting of a Lithium-Ion battery and an alkaline battery;

at least one super-capacitor for exchange of electric power;

a heat management system for managing the heat generated by said plurality of fuel cells and by said at least one electrolyzer, wherein said heat management system uses the heat for said hydrogen storage and for said oxygen storage; and a water tank;

wherein said at least one electrolyzer splits water through electrolysis into hydrogen and oxygen;

wherein a portion of said hydrogen produced in said electrolyzer is hydrogen storage stored in said hydrogen tank;

wherein a portion of said oxygen produced in said electrolyzer is oxygen storage stored in said oxygen tank;

wherein said hydrogen storage is selected from the group consisting of an underground system, a pressurized vessel, a liquid hydrogen, a solid hydrogen in hydride vessels, and a reversible chemical absorber;

wherein said oxygen storage is selected from the group consisting of an underground system, a pressurized vessel, a liquid oxygen, and a reversible chemical absorber;

wherein said plurality of fuel cells convert chemical energy of said hydrogen and said oxygen into electrical energy; and further wherein said water tank collects water from said plurality of fuel cells and passes said water to said electrolyzer for electrolysis of said water.

2. The hydrogen energy storage system of claim 1 further comprising a first power conditioner at an input port and a second power conditioner at an output port of said hydrogen energy storage system, wherein said first power conditioner and said second power conditioner selectively convert DC to DC power and convert DC to AC power.

3. The hydrogen energy storage system of claim 2 further comprising a plurality of switches between said first power conditioner and said second power conditioner for selectively controlling a flow of electrical energy between said first power conditioner and said second power conditioner.

4. The hydrogen energy storage system of claim 3, wherein a first switch selectively connects said first power conditioner to said output port.

5. The hydrogen energy storage system of claim 4, wherein a second switch selectively connects a hydrolyzer to said input port through said first power conditioner.

6. The hydrogen energy storage system of claim 5, wherein a third switch selectively connects said plurality of batteries to said input port.

7. The hydrogen energy storage system of claim 6, wherein a fourth switch selectively connects said plurality of batteries to said output port.

8. The hydrogen energy storage system of claim 7, wherein a fifth switch selectively connects said hydrolyzer to said output port through said second power conditioner.

9. A hydrogen energy storage system comprising:

at least one electrolyzer;

a hydrogen tank;

an oxygen tank;

a plurality of fuel cells; and a water tank;

wherein said at least one electrolyzer splits water through electrolysis into hydrogen gas and oxygen gas;

wherein a portion of said hydrogen gas produced in said electrolyzer is hydrogen gas storage stored in said hydrogen tank;

wherein a portion of said oxygen gas produced in said electrolyzer is oxygen gas storage stored in said oxygen tank;

wherein said plurality of fuel cells convert chemical energy of said hydrogen gas and said oxygen gas into electrical energy;

wherein said water tank collects water from said plurality of fuel cells and passes said water to said electrolyzer for electrolysis of said water;

a first power conditioner at an input port and a second power conditioner at an output port of said hydrogen energy storage system;

wherein said first power conditioner and said second power conditioner selectively convert DC to DC power and convert DC to AC power; and a plurality of batteries, wherein said plurality of batteries store electricity produced by said hydrogen energy storage system;

a heat management system for managing the heat generated by said plurality of fuel cells and by said at least one electrolyzer, wherein said heat management system uses the heat for said hydrogen storage and for said oxygen storage; and a plurality of switches between said first power conditioner and said second power conditioner for selectively controlling a flow of electrical energy between said first power conditioner and said second power conditioner.

10. The hydrogen energy storage system of claim 9, wherein a first switch selectively connects said first power conditioner to said output port, and further wherein a second switch selectively connects a hydrolyzer to said input port through said first power conditioner.

11. The hydrogen energy storage system of claim 10, wherein a third switch selectively connects said plurality of batteries to said input port, and further wherein a fourth switch selectively connects said plurality of batteries to said output port.

12. The hydrogen energy storage system of claim 11, wherein a fifth switch selectively connects said hydrolyzer to said output port through said second power conditioner.

* * * * *